United States Patent Office 2,911,587
Patented Nov. 3, 1959

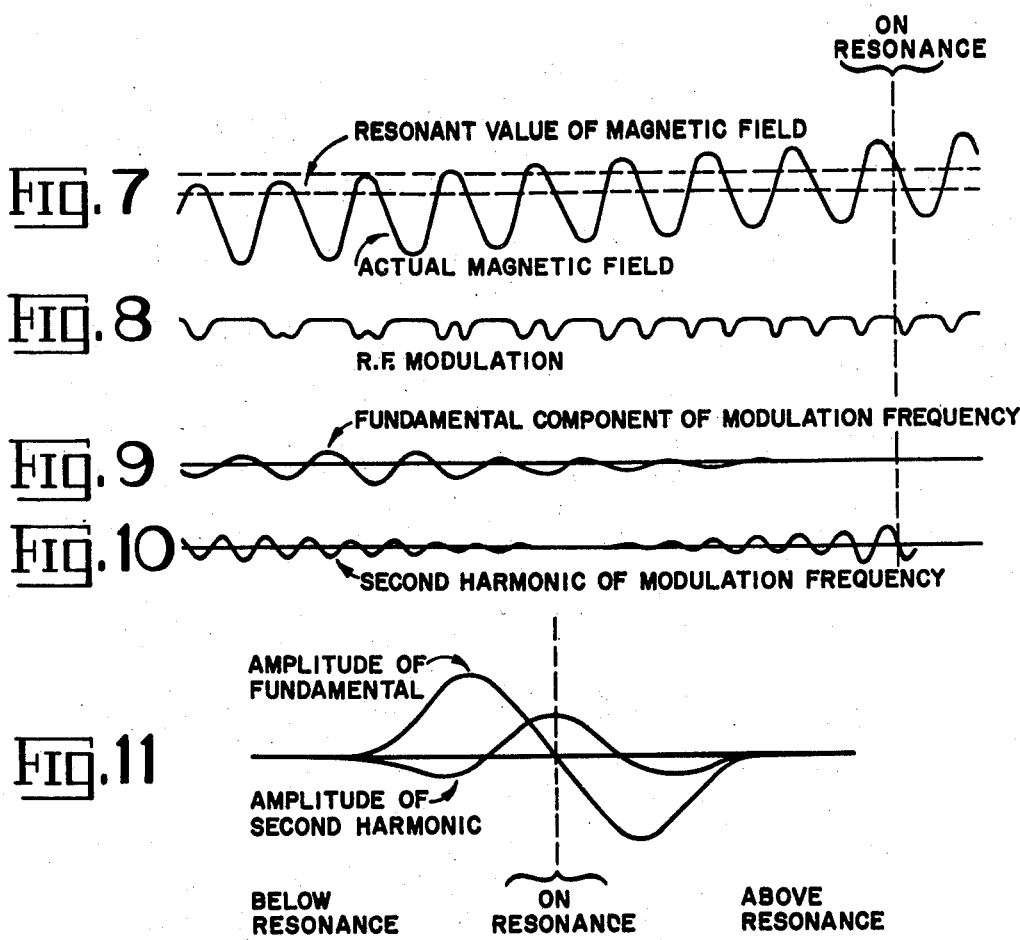

2,911,587
PROTON RESONANCE MONITOR

John G. Bayly, Deep River, Ontario, Canada, assignor, by mesne assignments, to the United States of America as represented by the United States Atomic Energy Commission Application July 22, 1955, Serial No. 523,879

5 Claims. (Cl. 324—.5)

This invention relates to apparatus for use in monitoring by means of nuclear magnetic resonance, and although not limited thereto, is particularly directed to monitoring the isotropic purity of heavy water.

As is known, where heavy water is used in a reactor pile it is desirable to continuously analyse the purity of the heavy water, for example to detect faults in the functioning of the reactor. Although several methods of analysing the heavy water have been used, it has been found that one of the best of such methods is by the use of nuclear resonance absorption effects.

Nuclear resonance absorption may be carried out, briefly, by placing a sample of material in two fields, a modulated magnetic field and a radio frequency field at right angles to the magnetic field. This procedure will be referred to more fully below as it relates to the present invention.

Using the nuclear magnetic resonance technique, the sensitivity for detecting protons depends upon the rate at which radio frequency energy can be absorbed by the protons. Since the protons have what is known in the art as "spin 1/2," they can exist in the magnetic field in only two ways, spins parallel and antiparallel. The energy difference between these two levels leads to a Boltzmann distribution of populations of the levels, with the lower energy state having a greater population. Where there is also a radio frequency field present, the action of the radio frequency field is to tend to equalize these populations. Since this raises the average energy, radio frequency power is absorbed, the amount of power absorption depending on the excess population of the lower state. The protons reach their Boltzmann equilibrium distributed by exchanging energy with the molecular lattice a process whose rate is described by the spin-lattice relaxation time denoted herein as $T_1$. If $T_1$ is reduced, the excess population builds up more rapidly and the radio frequency power which can be absorbed increases. Thus the sensitivity of detection is dependent on $T_1$.

In the case of ordinary pure water, $T_1$ is 2.3 seconds. This relatively small value results from the large magnetic interaction between protons. In the case of heavy water the interaction between protons and deuterons is small since the magnetic moment of the deuteron is only one-third that of the proton. The result is that a proton whose neighbors are predominantly deuterons has a relaxation time $T_1$ of about 30 seconds.

For some purposes other than the present one, $T_1$ may be reduced by adding a solution containing paramagnetic ions, which have magnetic moments several thousand times greater than nuclei, and result in correspondingly greater interaction. Paramagnetic ions cannot of course be added to heavy water to reduce $T_1$ where heavy water is used as a nuclear reactor moderator since it is essential to keep the heavy water as pure as possible.

It has been found that an effect equivalent to a reduction of $T_1$ may be obtained by bringing a continuous flow of water which has reached its equilibrium excess population state into the detecting region.

To obtain a supply of heavy water with a large excess population it has been found that the heavy water should be stored for about 30 seconds in a high magnetic field. The water is then allowed into the detecting region where the radio frequency field destroys the excess population. The hydrogen content of the water is proportional to the rate at which radio frequency power is absorbed, and this absorption of power reduces the radio frequency voltage of the oscillator which supplies the radio frequency power.

The increase in sensitivity and its variation with flow rate as found in practice, agree with the theoretical predictions to within about 10%. This agreement compares satisfactorily with other experimental results in this general field.

Previous work on nuclear resonance absorption effects as related to flowing liquids has been set out in a publication in the Proceedings of the Indian Academy of Sciences, 1951, pages 107 ff., by C. Suryan, "Nuclear Resonance in Flowing Liquids."

Suryan's publication discloses the idea of increasing the nuclear resonance sensitivity by means of flow of the sample but the apparatus herein disclosed is not found or suggested in Suryan's publication and the present invention is considered to be an improvement over Suryan.

The present invention contemplates the same general electrical techniques used by virtually all workers in this field, namely that of sweeping the magnetic field back and forth through resonance, so that the absorption of power at resonance produces amplitude modulation of the radio frequency voltage. Apart from the use of a flowing sample the most distinctive feature of the present apparatus is in the use of the same amplitude modulated signal both for detecting the size of the resonance and for maintaining the resonant condition between the magnetic field and the frequency. A diode detector is used to produce an audio frequency voltage whose wave shape is that of the radio frequency modulation.

A Fourier analysis of the wave shape shows that it contains the sweep frequency and its harmonics. The phases and amplitudes of these frequencies vary depending upon how far the average value of the magnetic field is from resonance. As the average value of the magnetic field is increased toward the resonant value, the amplitude of the fundamental frequency component approaches zero. When the field increases above resonance, the fundamental increases, but its phase is reversed.

This characteristic makes the fundamental frequency useful for regulating the frequency or field to maintain resonance. A simple servo motor is used to adjust either frequency or field in response to the amplitude and phase of the fundamental, and the equipment remains stable at the resonant point.

The second harmonic of the modulation reaches a maximum at this resonant condition. The second harmonic is thus a useful measure of the hydrogen content.

A narrow band pass amplifier filters out noise and amplifies the second harmonic. A synchronous detector is used to produce a direct current suitable for a recording meter. By filtering the direct current, the band width of the detector can be made extremely small at the expense of having a more slowly responding instrument.

It is of interest to compare the sensitivity of the device herein described with theoretical sensitivity. The theoretical value can be obtained from the expression given by Bloembergen, Purcell and Pound in their paper in "Physical Review," April 1948.

Assuming that a magnetic field of 5000 gauss is made uniform to 1 part in 10,000 over a sample volume of 10 cubic centimeters, the theoretical signal to noise ratio is about unity if there is one proton for every 5000 deuterons in the water, the latter condition obtaining when the water is not flowing. The band width for this sensitivity would be about 1/10 cycle/sec. and the response time about 3 seconds.

If the water now begins to flow from a storage volume in the magnetic field, the sensitivity increases by a factor of about ten, giving a theoretical limit of detection of about one hydrogen atom in 50,000.

Theoretical signal to noise ratios are difficult to attain, but it has been found possible to obtain a noise factor of between 3 and 5. This lowers the practical limit of detection at about one in 10,000. Increasing the magnetic field to 12,000 gauss should result in a limit of about 20 parts per million.

The overall time before the device herein disclosed responds to a change in the hydrogen content of the water is the storage time plus the delay of the synchronous detector. This totals less than one minute, and could be made as short as thirty seconds. There is, of course, no sampling loss whatever.

The invention will now be described with the assistance of the accompanying drawings wherein a preferred embodiment is shown and wherein identical reference numerals denote like parts in all figures. It will be realized that the embodiment is capable of various changes within the scope of the invention, and accordingly the embodiment shown and described is to be construed by way of example and not by way of limitation.

Figures 7–11 show a series of graphical representations illustrating the function of the device herein described.

Figure 1:
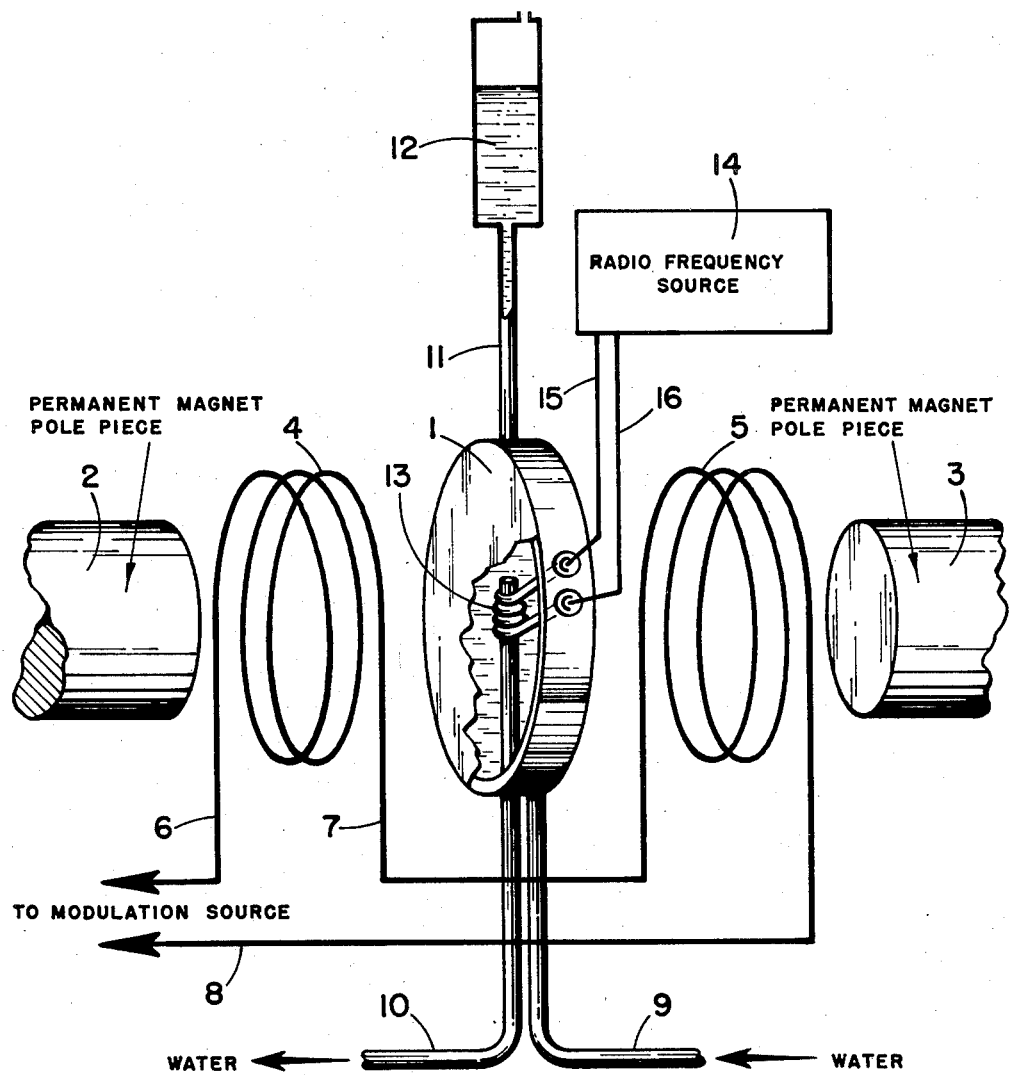
Figure 1 shows an oblique "exploded" partly schematic view of a preferred embodiment of the present invention, with certain details omitted.

Referring first to Figure 1 where an oblique "exploded" view of an embodiment of the invention is illustrated, a delay chamber is shown at 1, but most of its detail is omitted in this figure for the purpose of simplicity and will be disclosed below.

It is contemplated that heavy water will be continuously passed through delay chamber 1 and will be subjected to a modulated magnetic field and a radio frequency field perpendicular to such magnetic field.

Permanent magnet pole pieces are denoted by 2 and 3, providing a strong magnetic field therebetween of the order of 8000 gauss. In a practical embodiment of the apparatus described herein a permanent magnet found suitable was manufactured by Indiana Steel Company. This magnet has a pole gap of two inches between pole pieces 2 and 3. It is contemplated that the delay chamber will fit against the pole pieces 2 and 3 although in Figure 1 a large separation is shown incidental to the "exploded" view.

The magnetic flux is modulated by coils denoted by 4 and 5, and in a practical form as successfully built, coils 4 and 5 surround the pole pieces 2 and 3. Coils 4 and 5 are connected in series by means of leads denoted by 6, 7 and 8, so that a variable current applied between leads 6 and 8 will modulate the field.

Heavy water is admitted to the inside of the periphery of delay chamber 1 through a tube denoted by 9, and it is contemplated that the heavy water will flow in a spiral path, to the center of delay chamber 1 and emerge therefrom through another tube denoted by 10.

It is desired to remove bubbles from the heavy water passing through delay chamber 1, and for this purpose a vent tube denoted by 11 is provided, communicating with the delay chamber 1 at its highest point. Vent tube 11 extends upwardly and is connected to an open-top chamber denoted by 12, slightly greater in height than the head corresponding to the water pressure in delay chamber 1. The construction shown for removing bubbles may be varied but it has been satisfactory in the form illustrated.

As already mentioned, at the detection point of the system there is a combination of a strong magnetic field and a radio frequency field at right-angles to the former. The radio frequency field may be applied by a coil denoted by 13 which surrounds tube 10 at the central part of delay chamber 1 so that the outflowing heavy water will pass through coil 13 on its way out of the delay chamber 1. The region in and around coil 13 is the detecting volume of the system. Coil 13 will be described below, and it is apparent from Figure 1 that it is connected to a radio frequency source denoted by 14 by two lines denoted by 15 and 16.

Figure 2:
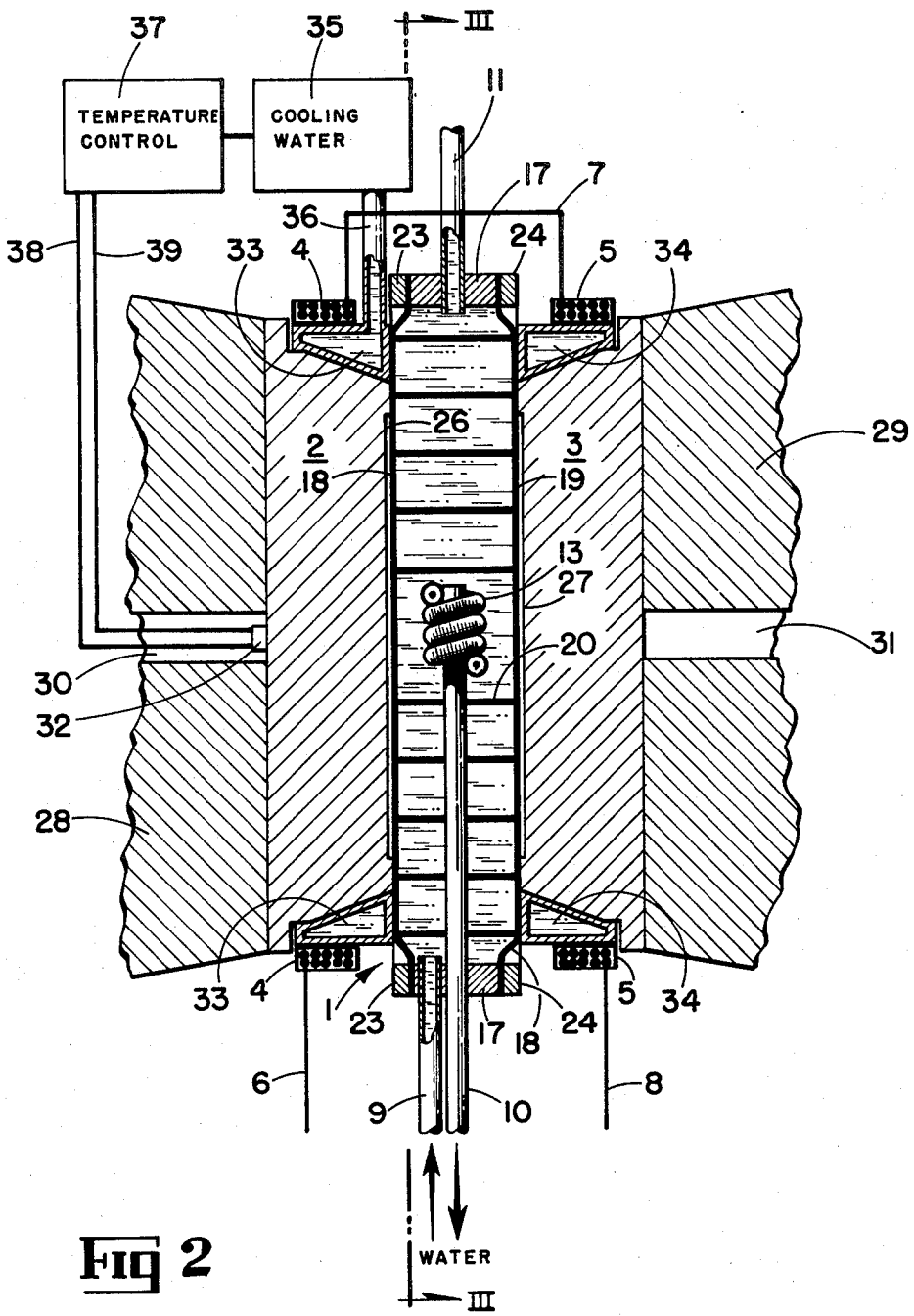
Figure 2 shows an elevation cross-sectional view of a practical form of the central parts of the embodiment shown in Figure 1.

Referring to Figure 2, it will be seen that the principal features of delay chamber 1 (which may be called a "meander chamber" to give it an additional functional description) are an annular shell denoted by 17, attached covers denoted by 18 and 19, a spiral wall denoted by 20, as well as the previously described features, inlet tube 9, outlet tube 10, vent tube 11 and coil 13.

Figure 3:
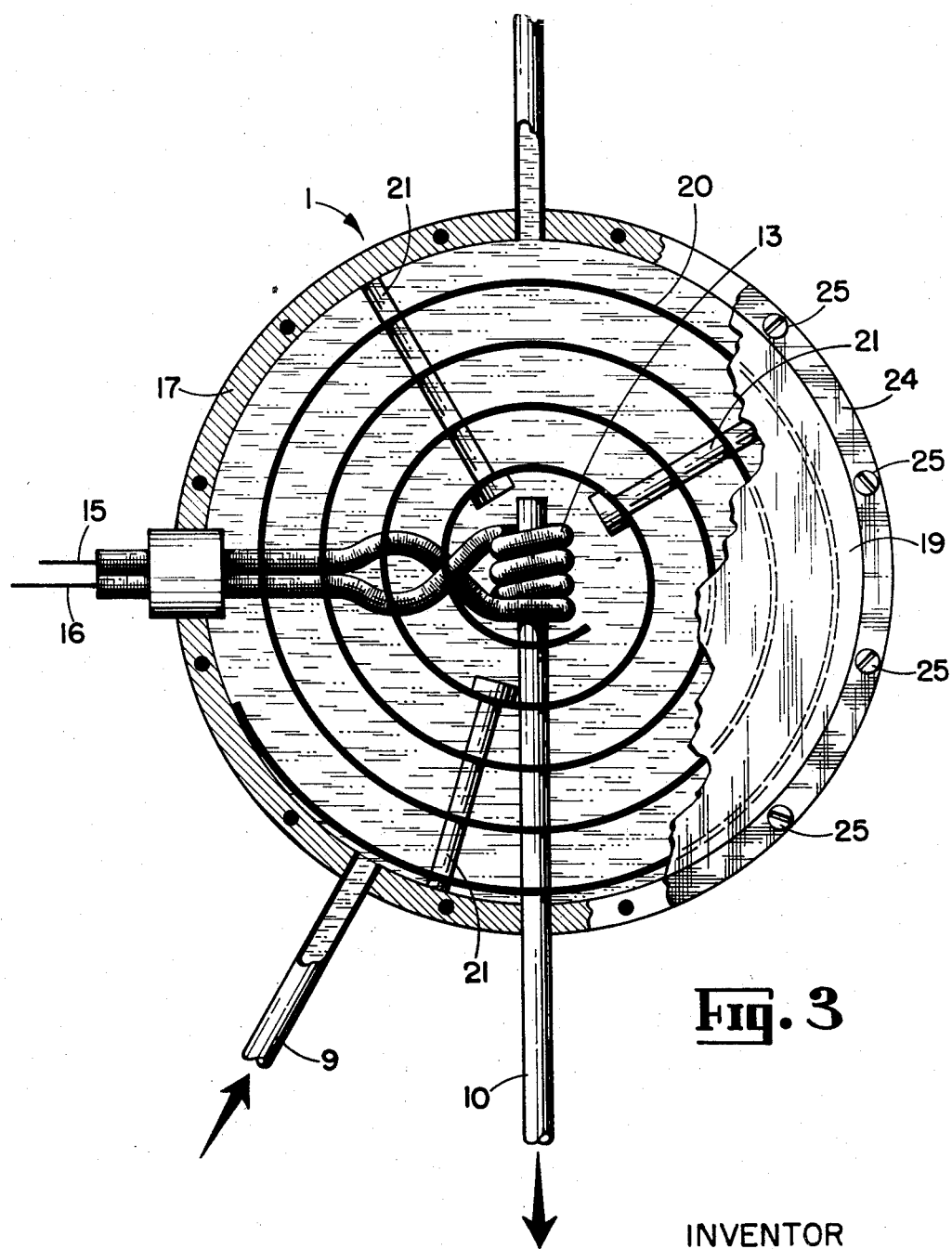
Figure 3 shows an elevational partly cross-sectional view of the delay chamber denoted by reference numeral 1 in Figure 1, and as seen at III—III in Figure 2.

The spiral wall 20 is held in place by bracing rods 21, shown only in Figure 3 in the interests of simplicity. Bracing rod 21 may be in the form of a threaded rod of insulating material which does not contain hydrogen, threaded at one end thereof and making threadable engagement with annular shell 17. Suitable spacers are provided between each of the convolutions of spiral wall 20.

It is contemplated that heavy water will enter through inlet tube 9, will pass around the spiral path formed by spiral wall 20, and after an appreciable period of time in the strong magnetic field between pole pieces 2 and 3 the heavy water will pass out through outlet tube 10, also passing through coil 13 as it leaves delay chamber 1.

Since measurements will be made in respect of hydrogen ion resonance in the heavy water passing through delay chamber 1, accurate results cannot be obtained if there are hydrogen-containing compounds present (other than in the heavy water) in the observed part of the system. In addition, the amount of electrically-conducting material in such region must be kept to a minimum, to prevent weakening of the magnetic field by eddy currents.

It has been found satisfactory if shell 17 is made of metal, since it will not be in a region of concentrated magnetic field, but the covers 18 and 19, spiral wall 20, the internal part of outlet tube 10, bracing rods 21, the insulation in coil 13 and its leads 15 and 16 should all be of an insulating material which does not contain hydrogen.

It will be seen that a substance such as polythene, $(C_2H_4)_n$, although a good insulator, would not be satisfactory because it contains hydrogen, and in a practical form of the device it has been found satisfactory if the covers 18 and 19, spiral wall 20, outlet tube 10 and bracing rods 21 are of polymerized polytetrafluor-ethylene, $(C_2F_4)_n$, as sold by Minnesota Mining & Refining Company under the trademark "Teflon."

For the insulation in coil 13, polymerized polytrifluorchlorethylene, $(C_2F_3Cl)_n$, has been found satisfactory in a practical form of the device. This substance is sold by The Kellog Company under the trademark "Kel-F."

Figure 4:
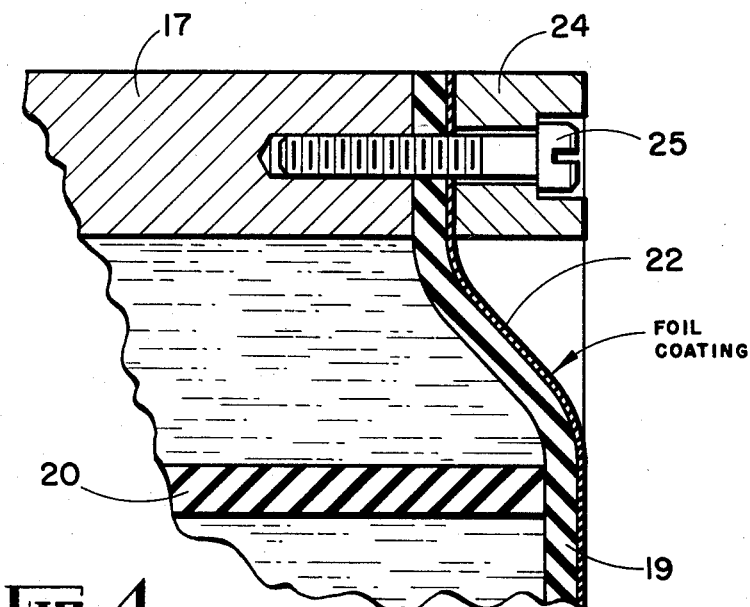
Figure 4 shows an enlarged fragmentary cross-sectional view of a portion of the delay chamber 1 as shown in Figure 2, to more fully disclose its construction.

As already mentioned, it is not desired to have electrically-conducting material in the region of delay chamber 1 where observations are to take place. At the same time, it is necessary that delay chamber 1 be electrostatically shielded. Annular shell 17 being of metal has electrostatic shielding properties, but covers 18 and 19 being of insulating material do not. Accordingly, the external surface of covers 18 and 19 should be covered with light aluminum foil as shown in Figure 4, and denoted by 22. With the use of aluminum foil on the outside of both covers 18 and 19 of delay chamber 1, electrostatic shielding is achieved without providing a thickness of conducting material such that eddy currents can be generated therein. Covers 18 and 19 are held in place by rings denoted by 23 and 24 and screws denoted by 25, thus providing with foil 22 a continuous shield around delay chamber 1.

Figure 2 indicates the manner in which the delay chamber 1 is placed between the magnet pole pieces 2 and 3 in a practical construction. Pole pieces 2 and 3 are preferably of soft iron and have a tapered shape as shown and also counter-sunk faces denoted by 26 and 27. Pole pieces 2 and 3 are spaced apart just slightly more than the width of delay chamber 1. The covers 18 and 19 are disk-shaped so that the width is the same as at rings 23 and 24, and delay chamber 1 may be readily inserted between pole pieces 2 and 3.

The permanent magnet itself, of which portions are shown at 28 and 29 is made of a material that retains magnetism indefinitely. An alloy denoted as "Alnico V" developed by General Electric Company and consisting of aluminum, iron, nickel and cobalt has been found very satisfactory for this purpose, and it is the material used in the construction of a permanent magnet successfully used in connection with the present invention and manufactured by Indiana Steel Company as mentioned above.

Pole pieces 2 and 3 are attached to the permanent magnet numbers 28 and 29 in any desired manner.

In the practical embodiment as successfully operated, magnet elements 28 and 29 were provided with axial openings denoted by 30 and 31, respectively. The axial openings just referred to are of considerable facility in temperature control of the magnet elements 28 and 29, which is necessary owing to the fact that alloys of the kind mentioned temporarily lose part of their retained magnetism with changes in temperature. When the device is used for monitoring a reactor pile and heavy water circulating through delay chamber 1 the heavy water is necessarily hot, and if nothing were done to control the temperature, the heat radiated from delay chamber 1 would upset the functioning of the device.

Accordingly, a temperature sensitive element denoted by 32 is placed in opening 30 adjacent pole piece 2 and the temperature is controlled by means of cooling jackets denoted by 33 and 34, which are preferably in the form of hollow annular surrounding pole pieces 2 and 3.

Attention is directed to the shape of the cooling jackets 33 and 34, which are in cross-sectional view of general triangular shape, so as to fit snugly against pole pieces 2 and 3. The shape of cooling jackets 33 and 34 is dictated by convenience only, the considerations being that so far as cooling is concerned, a wide range of shapes would be satisfactory, but since it is necessary to fit the cooling jackets 33 and 34 into the device herein described, the shape as shown has been found satisfactory.

A cooling water source denoted by 35 feeds cooling water to jackets 33 and 34 by means of a tube denoted by 36. It will be realized that cooling water jackets 33 and 34 would be interconnected and a suitable outlet provided, such interconnections and outlet being not shown in the interests of simplicity. The temperature may be controlled either by controlling the amount of cooling water flowing from source 35 to cooling jackets 33 and 34 or by controlling the temperature of the water in cooling water source 35. Either or both of such expedients may be used, and a control device denoted by 37 connected to cooling water source 35 effects a control of the temperature in any desired manner. Connection is made between temperature responsive device 32 and control device 37 by means of leads 38 and 39.

The modulating coils 4 and 5 are preferably mounted in suitable formers (not shown) on cooling jackets 33 and 34, and the purpose of coils 4 and 5 has already been discussed.

Attention is directed to the fact that the coil 13 is midway between poles 2 and 3 and at right-angles to the direction of magnetic flux. It will be seen that after the heavy water has entered through inlet tube 9 and passed around the spiral formed by wall 20, the heavy water flows out through outlet tube 10 and in doing so passes through the center of coil 13.

The construction of the coil just referred to will now be described with reference particularly to Figures 5 and 6.

Coil 13 surrounds the outlet tube 10 and consists of a small number of turns of wire insulated with a material such as "Teflon" or "Kel-F" already referred to, for the reasons mentioned. The leads 15 and 16 from coil 13 do not emerge linearly from the delay chamber, but are crossed and looped as shown in Figure 5. The loops are denoted by 40 and 41 and are crossed at 42.

The reason for such configuration has reference to the fact that in a modulated magnetic field, a coil such as 13 will ordinarily have a current induced therein as in the manner of the secondary of a transformer. An induced current in the coil 13 would upset the operation of the device, and the construction shown is for the purpose of making the coil non-inductive from the standpoint of the magnetic field in which it is situated.

As is known, the current induced in a coil in a magnetic field is proportional to the area of such coil according to the expression $$A\frac{dh}{dt}$$

Figure 5:
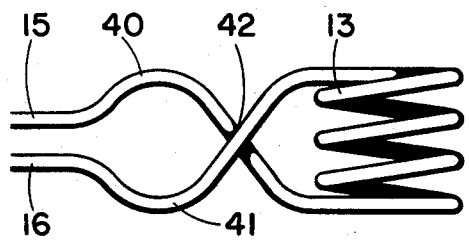
Figure 5 shows an elevation view of the radio frequency coil denoted by reference numeral 13 in Figures 1–3.
Figure 6:
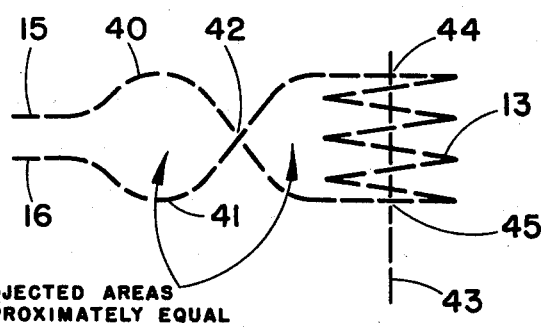
Figure 6 shows a schematic diagram to further illustrate the preferred construction of Figure 5.

Referring to Figure 6 where a schematic diagram of the construction of Figure 5 is shown, looking at the representation of the coil with reference to its center line denoted by 43, it will be seen that the area of the convolutions on one side of the center line substantially counter-balanced the area of the convolutions on the opposite side of the center line so that the coil 13 itself does not have any appreciable current induced therein. However, at low frequencies the coil 13 may be considered to be a single loop enclosed between the points denoted by 44 and 45 and by 42. To counter-balance the current induced in this loop, the leads 15 and 16 are reversed about 42 as shown, and the area enclosed by loops 40 and 41 is substantially equivalent to the area 42—44—45, but the current therein will be induced in an opposite sense and will counter-balance the former.

It is merely a matter of engineering design to choose the size and shape of loop between 40 and 41 so as to exactly counter-balance the effect of loop 42—44—45, but a rough approximation is sufficient for all practical purposes.

The reversed loop referred to is held in position by means of the spiral wall 20.

The function of the device will be apparent from the foregoing and for greater certainty reference is made to Figures 7–11.

In Figure 7 the "on-resonance" condition applies when the average value of the actual magnetic field is equal to the resonant value of the magnetic field.

As shown in Figure 8, radio-frequency energy is absorbed, and radio-frequency modulation produced, when the actual field is in the neighborhood of the resonant value, that is, when it has a value between those indicated by the dotted lines. In the "on-resonance" condition this absorbtion occurs twice very cycle of the magnetic field modulation, so that the dominant frequency in the radio-frequency modulation is twice that of the field modulation.

I claim:
1. A device adapted to form part of an apparatus for monitoring proton resonance in a liquid comprising two pole pieces of a magnet defining a gap therebetween, a hollow shell with parallel sides defining a meander chamber, said chamber being positioned within said gap, an inlet to said chamber adjacent the outer edge of said pole pieces, an outlet from said chamber comprising a tube extending into said chamber having an opening in communication with the chamber at a point adjacent the central part of said chamber, a radio frequency coil within the chamber and surrounding the said outlet tube adjacent its opening, the axis of the coil being perpendicular to the axis of said pole pieces, means disposed within the chamber and surrounding said radio frequency coil and outlet opening defining a spiral channel between said inlet and outlet opening for delaying the passage of the liquid to said outlet opening, during which time the liquid is premagnetized.

2. A device according to claim 1 wherein said channel means comprising a partition formed to provide a spiral passageway of extended length for the liquid between said inlet, located at one end of said spiral passageway, and said outlet opening located at the other end of said spiral passageway.

3. A device as claimed in claim 1, wherein the outside surface of said shell and parallel sides is metallic, said chamber and radio frequency coil being completely enclosed within this metallic shield and thereby protected from external electrostatic influences.

4. A device used with apparatus for monitoring proton resonance in a liquid comprising two pole pieces of a magnet defining a gap therebetween, a fluid tight tank having a cylindrical chamber therein axially aligned with the axis of said pole pieces and positioned within said gap, an inlet pipe entering through the annular portion of said tank to communicate with said chamber, an outlet pipe entering through the annular portion of said tank and having an opening communicating with chamber adjacent the central area of said chamber, a radio frequency coil wound around said outlet pipe adjacent said outlet opening with the axis of said coil perpendicular to the axis of said pole pieces, a dividing wall within said chamber extending from the annular shell of said tank adjacent said inlet pipe and circling the chamber and outlet opening with decerasing diameter to confine passage of an entering liquid to a continuous passageway of extended length between said inlet pipe and said outlet opening.

5. A device used with apparatus for monitoring proton resonance in a liquid comprising a hollow shell with parallel sides, said sides facing the pole pieces of a magnet, and an inlet duct for the chamber within said shell opening into said chamber adjacent the outer edge of said pole pieces, an outlet duct commencing at a point adjacent the axis of said pole pieces and surrounded by a radio frequency coil, said coil having extended leads overcrossing at a point, a loop in each lead on the side of the cross-over point removed from the coil, the area enclosed by the lead loops being substantially equal to the loop area of the coil at low frequencies.

References Cited in the file of this patent

UNITED STATES PATENTS

| | | |
|---|---|---|
| 2,561,489 | Bloch | July 24, 1951 |
| 2,589,494 | Hershberger | Mar. 18, 1952 |
| 2,721,970 | Levinthal | Oct. 25, 1955 |
| 2,756,383 | Nold et al. | July 24, 1956 |
| 2,799,823 | Shaw et al. | July 16, 1957 |

OTHER REFERENCES

Physical Review, vol. 73, No. 7 (April 1, 1948), pp. 679–712.

Proc. Indian Acad. Sc. (1951), "Nuclear Resonance in Flowing Liquids," by Suryan, page 107.